A. C. STEWART.
VALVE.
APPLICATION FILED NOV. 22, 1909.
1,005,581.
Patented Oct. 10, 1911.
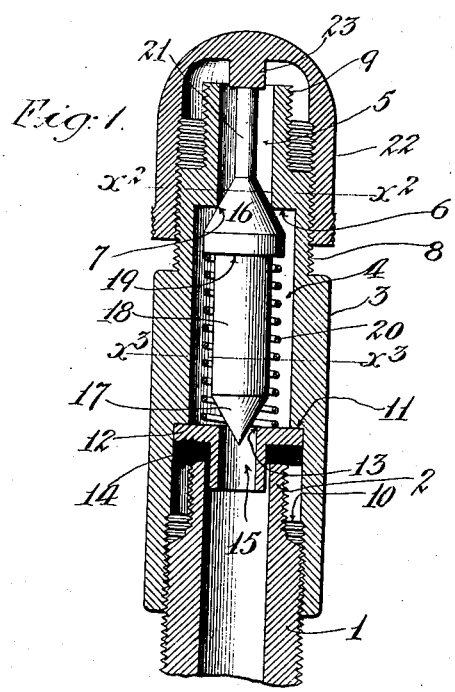
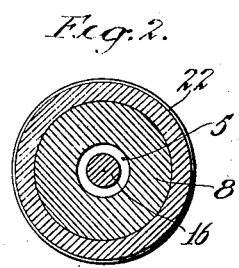
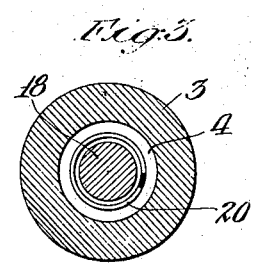
Witnesses:
Inventor:
Alfred C. Stewart

UNITED STATES PATENT OFFICE.

ALFRED C. STEWART, OF LOS ANGELES, CALIFORNIA.

VALVE.

1,005,581.

Specification of Letters Patent. Patented Oct. 10, 1911.

Application filed November 22, 1909. Serial No. 529,476.

*To all whom it may concern:*

Be it known that I, ALFRED C. STEWART, a citizen of the United States, residing at Los Angeles, in the county of Los Angeles and State of California, have invented a new and useful Valve, of which the following is a specification.

This invention relates to valves particularly adapted for pneumatic tires, and the main object of the invention is to provide a valve which may be readily screwed to the valve stem of a pneumatic tire as a substitute for the regular valve, which, when the regular valve is removed and the substitute valve is applied, will produce a large air passage making it much easier to inflate the tire than with the original valve and to also provide a positive closure after inflation which will absolutely prevent leakage.

In the ordinary valve for pneumatic tires leakage often occurs owing to the imperfect closure of the valve against its seat, which closure is ordinarily effected by spring pressure and by the pressure of the air within the tire. Leakage is also apt to occur at the imperfect closure between the cap and end of the valve stem. In the present invention the valve is closed against its lower seat after inflation, and means are provided whereby the valve is mechanically and positively forced tight against its lower seat, thereby absolutely preventing leakage as the cap is not depended upon as in the ordinary type of valve.

While the present invention does not absolutely necessitate the removal of the regular valve, nevertheless, when the present invention is employed it is contemplated that the regular valve should be removed as its presence would nullify the ease of inflation afforded by the invention which is the most important office of this invention, and in fact the presence of the regular valve after the application of the substitute valve is superfluous.

Referring to the drawings: Figure 1 is a vertical, longitudinal section taken diametrically through the valve when employed as a substitute valve, the view being on a large scale. Fig. 2 is a cross section on line $x^2$—$x^2$ Fig. 1. Fig. 3 is a section on line $x^3$—$x^3$ Fig. 1.

Referring to the form shown in Figs. 1, 2 and 3, 1 designates the regular valve stem externally threaded and having a reduced upper end 2 also externally threaded. The regular valve, not shown, has been removed. The substitute valve comprises a sleeve 3 provided with a main valve chamber 4 and an outer valve chamber 5, the latter being of less size than the main valve chamber 4 and communicating therewith through an outer valve seat 6 formed by an abrupt shoulder producing a single line of contact 7. The sleeve 3 has an externally threaded reduced portion 8 above which is an externally threaded end 9 adapted for the attachment of the middle of the inflation tube, not shown. The lower end of the sleeve 3 is provided with internal threads 10 adapted to be screwed onto the threaded valve stem 1 and the sleeve 3 has an internal shoulder 11 which bears against a flanged thimble 12 having a right-angled edge 13 forming a valve seat with a single line of contact. Below the flange of the thimble 12 is a gasket 14 which prevents leakage between the upper edge of the valve stem 1 and the thimble 12. The thimble 12 has a large bore 15 which forms a large air passage for the inflowing air during inflation.

Within the main valve chamber 4 is a double valve comprising a conical upper valve 16 adapted to coact with the seat 7 and a conical lower valve 17 adapted to coact with the seat 13, a cylindrical shank 18 extending between the two valves with a shoulder 19 formed immediately below the upper valve 16. A coil compression spring 20 is interposed between the shoulder 19 and the thimble 12 and normally holds the double valve elevated with the outer valve 16 in contact with the seat 7, thus effecting a closure at this outer seat. Extending above the upper valve 16 is an extension 21.

22 designates a cap internally threaded and adapted to be screwed to the threaded portion 8 and provided with an internal boss 23 which is adapted to bear against the upper end of the valve extension 21.

In operation, the valve having been applied as indicated in Fig. 1, when it is desired to inflate the tire, the cap 22 is removed and the inflation tube, not shown, is screwed on the threaded end 9 and air is forced through the passage 5 and overcoming the spring 20 forces down the upper valve 16, thereby opening the valve seat 7 and the air then flows through the main valve chamber 4, thence through the air passage 15, through the stem 1 into the tire. Upon any relaxation in pressure above the upper valve 16 the spring 20 immediately closes the upper valve 16 against the seat 7, thereby preventing backward passage of air which has entered the main chamber 4. After the inflation has been accomplished, the cap 22 is screwed onto the threaded portion 8 and as soon as its boss 23 strikes the extension 21 it pushes down the double valve, thereby opening the valve 16 and closing the lower valve 17. The moment that the upper valve 16 is thus opened, air from within the main chamber 4 passes into the upper smaller chamber 5, so that the air pressure within chamber 5 equalizes with the pressure within the tire. Continued downward movement of the cap 22 soon brings the lower valve 17 into contact with the seat 13 against which seat it is tightly forced with a wedging action due to its conical shape, so that a closure against the lower seat of great strength is effected, which positively prevents the air from within the tire passing outwardly past the seat 13. Owing to the conical shape of the lower valve 17, together with the single line of seat contact 13, it is possible to produce an absolutely air-tight union with comparatively little pressure, and the screw-cap 22 furnishes an ample pressure against the valve extension 21 for this purpose. During the inflation the large passages 5 and 15 permit the air to easily pass inward into the tire and owing to the line of contact between valve 16 and its seat 7, there is comparatively no opposition to overcome except that of the spring 20 which spring opposition is obviously very slight, being merely sufficient to close the valve 16 to act as a chamber valve.

What I claim is:

In a valve, a sleeve having internal threads at its lower end adapted to be screwed onto a threaded valve stem, the upper end of said sleeve having a reduced threaded end for the attachment of an inflating tube and having an intermediate threaded portion, said sleeve being provided with an internal shoulder near its upper end and with an internal shoulder near its lower end, a thimble seated against the lower internal shoulder and forming a lower valve seat, the upper shoulder forming an upper valve seat, there being a valve chamber formed between the upper shoulder and said thimble, a double valve within said valve chamber comprising two cones connected by a shank, a spring resting on said thimble and against the upper cone normally holding the upper cone against its seat, a screw cap adapted to be screwed on the external threads of the sleeve, and an extension between said cap and upper cone for mechanically forcing the lower cone against its seat in said thimble.

In testimony whereof, I have hereunto set my hand at Los Angeles, California, this 13 day of November, 1909.

ALFRED C. STEWART.

In presence of—
G. T. HACKLEY,
P. H. SHELTON.